United States Patent [19]

Haller

[11] 4,211,944

[45] Jul. 8, 1980

[54] AMORPHOUS METAL ELECTRIC MOTOR WITH INTEGRAL CAPACITOR

[75] Inventor: Theodore R. Haller, Schenectady, N.Y.

[73] Assignee: General Electric Company, Schenectady, N.Y.

[21] Appl. No.: 914,444

[22] Filed: Jun. 12, 1978

[51] Int. Cl.$^2$ ............................................. H02K 11/00
[52] U.S. Cl. ....................................... 310/72; 361/303
[58] Field of Search ................ 310/72, 271, 216, 217, 310/68, 45, 254, 259, 261, 264, 265, 271; 361/303; 336/213

[56] References Cited

U.S. PATENT DOCUMENTS

| | | | |
|---|---|---|---|
| 2,032,129 | 2/1936 | Jackson | 310/72 |
| 2,088,949 | 8/1937 | Fekete | 310/68 R |
| 3,013,168 | 12/1961 | Ellis | 310/254 |
| 3,092,767 | 6/1963 | Schilling | 310/72 |
| 3,188,505 | 6/1965 | Wiley | 310/259 |
| 3,213,302 | 10/1965 | Barney | 310/216 |
| 3,215,910 | 11/1965 | Schilling | 361/303 |
| 3,519,902 | 7/1970 | Morozovsky | 361/303 |
| 3,886,256 | 5/1975 | Ohuchi | 310/261 |
| 4,116,728 | 9/1978 | Becker | 336/213 |
| 4,155,397 | 5/1979 | Honsinger | 164/429 |

OTHER PUBLICATIONS

"Potential of Amphorous Alloys For Application in Magnetic Devices"; Luborsky et al; 3/78.
"Principles and Practice of Elect. Eng."; Gray; 1947.

Primary Examiner—R. Skudy
Attorney, Agent, or Firm—Donald R. Campbell; James C. Davis; Marvin Snyder

[57] ABSTRACT

An electric machine with a laminated stator or rotor core made of magnetic amorphous metal ribbon takes advantage of the increased lamination area due to the inherent thinness of the material to utilize the laminations as the plates of a capacitor for starting, running, and/or power factor correction. Two amorphous metal ribbons with alternate insulating layers are wound two-in-hand either helically or spirally to fabricate the cores and more than one amorphous metal core, can be provided and connected as additional capacitors. The preferred embodiment is a single phase permanent split-capacitor motor with integral capacitor.

12 Claims, 9 Drawing Figures

U.S. Patent  Jul. 8, 1980  Sheet 1 of 2  4,211,944

# AMORPHOUS METAL ELECTRIC MOTOR WITH INTEGRAL CAPACITOR

BACKGROUND OF THE INVENTION

This invention relates to electric machines with magnetic cores made of amorphous metal ribbon, and more particularly to utilization of the amorphous metal material required for the magnetic circuit to serve also as the plate material of an integral capacitor.

Most single-phase motors use a capacitor for starting, running, or both, and this is required in order to achieve the required phase shift between main and auxiliary starting currents. The cost of this capacitor may in some cases exceed the cost of the base motor. There are other situations where a capacitor is associated with a motor or generator, such as for power factor correction or for filtering rectified power. In all of these cases the capacitor is normally a discrete component.

Motors and inductive components having laminated magnetic cores made from long lengths of amorphous metal ribbon, either toothed or with a uniform width, are a recent development in the art. Amorphous metals are also known as metallic glasses and exist in many different compositions including a variety of magnetic alloys which include iron group elements and boron or phosphorous. Metallic glasses are formed from metal alloys that can be quenched without crystallization, and these materials are mechanically stiff, strong and ductile, and are low cost. The ferromagnetic types have very low coercive forces and high permeabilities and are especially attractive because of their low losses. Ribbons of the $Fe_{80}B_{20}$ alloy have one-fourth the losses, at a given induction for sinusoidal flux, of the best oriented Fe-Si steel. Additional information is given in the article "Potential of Amorphous Metals for Application in Magnetic Devices" by F. E. Luborsky et al, Jr. of Applied Physics, 49(3), Part II, March 1978, pp. 1769–1774.

Amorphous metal is manufactured by extruding the melt under pressure onto a rapidly rotating very cold chill surface, and the liquid alloy is changed into a solid ribbon in a short time measured in micro-seconds before it becomes crystalline. The cooling rate is in the order of $10^6$ C./sec. The maximum ribbon thickness at present is two mils or less; the thickness limitation is set by the rate of heat transfer through the already solidified material, which must be rapid enough that the last increment of material still avoids crystallization. The inherently thin nature of this material and the large number of motor laminations that are needed-punched steel strip is commonly 10 mils or greater in thickness—is one of the assumed disadvantages of using amorphous metal alloys in electric motors.

SUMMARY OF THE INVENTION

The undesirably thin lamination thickness (about 1.5–2 mils) which is the maximum currently achieveable with amorphous metal ribbons is capitalized upon by utilizing the laminations of a properly configured magnetic core as the plates of a capacitor for starting, running, power factor correction and other uses in motors and generators. This integral construction is feasible because of the tremendously increased interlamination area with the thinner core material. Both stator cores and rotor cores can be constructed with an integral dry capacitor.

The combined laminated core and capacitor has multiple insulated turns of magnetic amorphous metal ribbon of relatively long length, and is comprised of a pair of superimposed or parallel ribbons and alternating insulating layers which are edge-mounted and wound helically or which are wound spirally like a roll of tape. An energizing winding is magnetically coupled with the amorphous metal laminated core, and at least part of the winding is also conductively or electrically connected to the pair of amorphous metal ribbons separated by insualting layers, which function as a capacitor in circuit relationship with the winding. Each ribbon is capacitively coupled to the other ribbon on either side so that the total capacitance is proportional to the total interlaminar area. The magnetic core structure can be composed of multiple helical cores concentric with one another, or multiple spiral cores axially aligned with one another, each core having a dual function as an isolated capacitor.

The preferred embodiment is a single phase permanent split-capacitor motor with a laminated stator core in which the two superimposed amorphous metal ribbons are helically wound and permanently electrically connected to function as a dry capacitor in series circuit relationship with the auxiliary winding. Another embodiment is a polyphase motor having plural concentric helical stator cores each magnetically coupled to the stator winding and also electrically connected across the windings to function as isolated power factor correction capacitors. Utilization of the core interlaminar capacitance results in cost, weight, and space savings.

DESCRIPTION OF THE PREFERRED EMBODIMENTS

Figure 1:
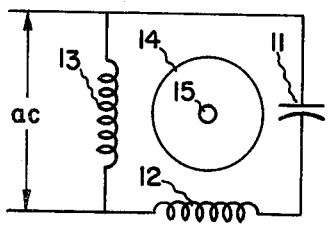
FIG. 1 is a simplified diagram of a prior art permanent-split-capacitor motor with separate capacitor.

To achieve a rotating magnetic field in a single phase electric motor it is necessary to have a phase difference between the motor currents in two windings, and the most efficient way to accomplish this is to use a capacitor. The objective is to produce a current in the auxiliary to start winding which is 90° displaced in phase from the current in the main winding, and this results in a uniform, balanced rotating field. There are three basic types of single phase motors with capacitors, and the permanent split-capacitor motor is the most efficient and ordinarily the most expensive. The prior art motor in FIG. 1 has a separate, external capacitor 11 in series with auxiliary stator winding 12, and the capacitor is permanently connected so that it is in the auxiliary winding circuit for starting and then remains for running to achieve good efficiency and improved performance. The pulsating flux of double frequency which is characteristic of single phase motors is reduced. The main or running winding at right angles to the auxiliary winding is indicated at 13, and the rotor and shaft at 14 and 15. Other types of single phase motors with capacitors are the capacitor-start motor, which has high starting torque but has a switch to disconnect the capacitor and start winding after getting up to speed, and the capacitor-start capacitor-run motor which switches between two values of capacitance, high for starting and low for running. There is a large class of motors where efficiency is important and the permanent split-capacitor motor is the best choice, such as compressors and fans in refrigerators and air conditioners.

Figure 2:
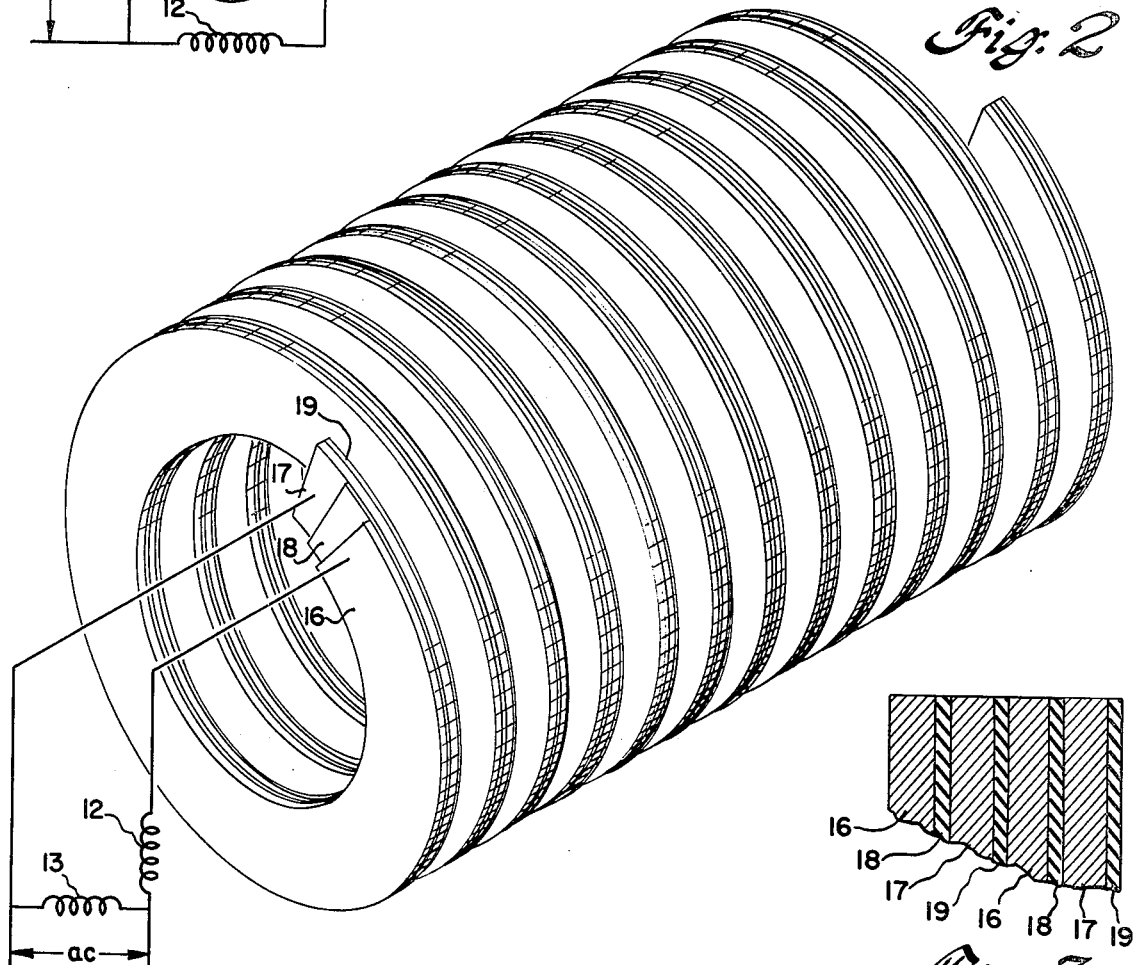
FIG. 2 is an expanded partial view of a two-in-hand helically wound amorphous metal core having a dual function as a capacitor and showing connections to the auxiliary winding.
Figure 3:
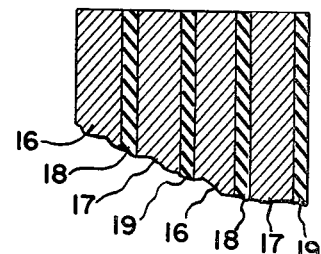
FIG. 3 is a fragmentary cross section of the assembled laminated core structure of FIG. 2.
Figure 4:
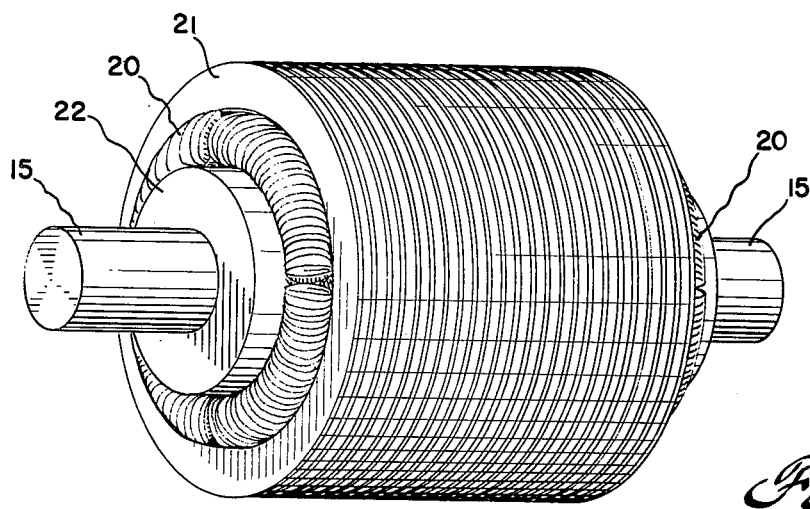
FIG. 4 is a perspective view of a slotless motor with a helical stator core serving as an integral capacitor.

The permanent split-capacitor motor illustrated in FIGS. 2-4 has a stator core made of magnetic amorphous metal ribbon which is specially constructed to also be a dry capacitor. This invention permits utilization of stator core material which is required for the magnetic circuit to serve also as the plate material of an integral capacitor, resulting in cost, weight, and space savings. The laminated stator core is magnetically coupled with the main and auxiliary stator windings to generate a rotating magnetic field in the air gap, and the ribbon core material in its dual function as a capacitor is conductively or electrically connected in series circuit relationship with the auxiliary winding. The total capacitance is more than enough or is adequate to provide proper phase shift and excellent power factor in such a motor. One of the previously assumed disadvantages of using amorphous metal alloys in electric motors has been the large number of laminations that have been required due to the inherently thin nature of this material. Ribbons of about 1.5 to 2 mils is the maximum thickness attainable in the forseeable future. This constraint is a result of the rapid cooling rate or quench rate of $10^5$° to $10^8$° C./sec. that is required to prevent formation of crystal structure. In spite of this thickness limitation, a number of ways are known for handling such material, and once assembled such a core has a significant interlaminar area. The capacitance of a capacitor is directly proportional to the area of the plates and to the dielectric constant of the insulator separating the plates, and is inversely proportional to the distance between plates. There is not too much that can be done about the dielectric constant and distance between plates, but the plate area is many times greater where the core laminations are made of very thin amorphous metal rather than the much thicker punched steel strip.

FIG. 2 shows to an expanded scale a few turns of an edge-wound or helical laminated core made essentially of a pair of superimposed magnetic amorphous metal ribbons 16 and 17 of relatively long length that alternate with insulating layers 18 and 19 and are wound helically similar to a Slinky ® spring toy. The capacitor connections are made to the ends of amorphous helices 16 and 17. Viewed as a capacitor, this structure can be called a dry parallel-plate capacitor. When the core is assembled and successive turns are contacting as in FIG. 3, each ribbon is capacitively coupled to the other ribbon on either side and the total capacitance is proportional to the total interlaminar area. One way of fabricating the helical stator core is to coat one surface of $Fe_{80}B_{20}$ alloy ribbon with varnish, and then take two such ribbons and wind them helically two-in-hand. Alternatively, one amorphous metal ribbon can be coated with varnish on both sides and wound two-in-hand with a plain ribbon. Other dielectrics such as Mylar ® polyester film can be employed.

The amorphous metal can be any of the magnetic alloys, and many different compositions for magnetic applications are presently known having iron, nickel, or cobalt, or any combination of these three metals, with boron and possibly phosphorous. The preferred composition because of its high induction characteristics is the $Fe_{80}B_{20}$ alloy, and another suitable amorphous metal is $Fe_{40}Ni_{40}P_{14}B_6$ or the variation of this material sold as METGLAS ® Alloy Ribbon 2826MB by Allied Chemical Corporation. In power frequency applications these materials are capable of exceeding to a substantial degree the properties of conventional Fe-Ni, Fe-Co, and Fe-Si alloys, and to offer a substantial cost saving. The $Fe_{80}B_{20}$ alloy ribbons have one-fourth the losses, at a given induction, for sinusoidal flux, of the best oriented Fe-Si sheet steel. The saturation magnetization of $Fe_{80}B_{20}$, however, is lower than that of many commonly used iron-based magnetic materials. Since the strip is very thin, the eddy current losses are smaller than for conventional laminations.

Figure 5:
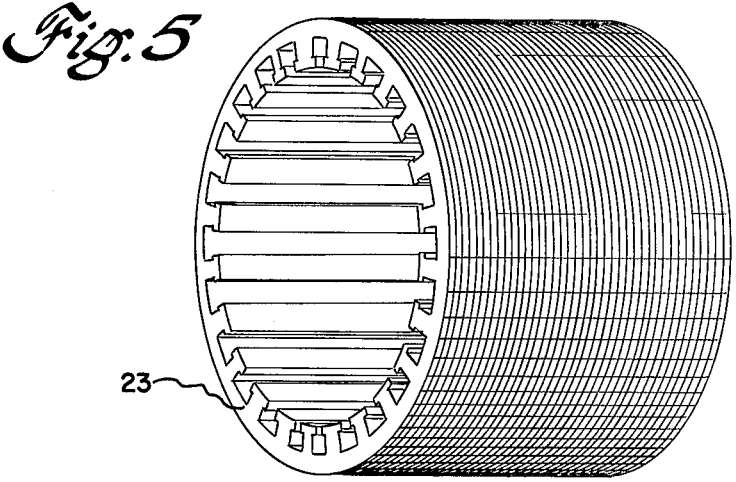
FIG. 5 shows an edge-wound stator core made from toothed amorphous metal ribbon.

The slotless permanent split-capacitor (induction or other type) motor with integral capacitor in FIG. 4 has the stator windings 20 lying in the air gap between the unsolotted helical stator core 21 and rotor structure 22. The combined core and dry capacitor is made from amorphous metal tape of uniform width as shown in FIG. 2 and is a simple cylindrical shell. Such a shape is ideally suited to manufacture with continuous helical strips of magnetic material. The main and auxiliary windings are displaced from one another as in a two-phase machine and can be of the single layer concentric type. The dual function stator core and capacitor can be made from toothed slotted amorphous metal ribbon as shown in FIG. 5, and in this case the motor windings are inserted into the stator slots. The toothed strip of motor laminations, either curled or naturally straight, can be manufactured directly from amorphous metal alloy melt in one process as described and claimed in copending application Ser. No. 903,140, filed on May 5, 1978 by V. B. Honsinger and R. E. Tompkins, now U.S. Pat. No. 4,155,397, entitled "Method and Apparatus for Fabricating Amorphous Metal Laminations for Motors and Transformers", and assigned to the same assignee as this invention.

To demonstrate that an assembled helical core has a significant interlaminar area, an example will be given. If a standard four horsepower hermetic compressor motor with a 6″ outer diameter, 3″ inner diameter, and a 5″ length were fabricated in this fashion from 1.5 mil material having a 0.5 mil insulation thickness, 2250 layers with a total area of 35,000 in.$^2$ would be provided assuming a 90% packing factor and 20% slot area. Choosing a varnish with dielectric constant of 4 results in a total capacitance of 64 microfarads which is more than enough to provide proper phase shift and excellent power factor in such a motor.

Figure 6:
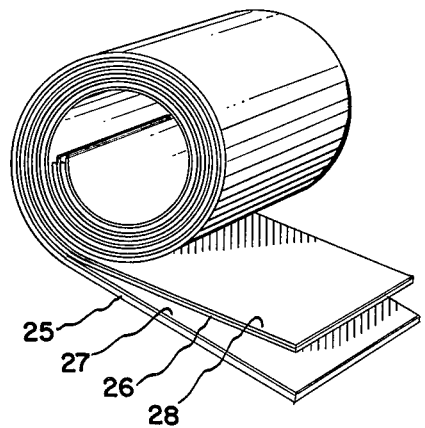
FIG. 6 is a partially expanded perspective view of a two-in-hand spirally wound amorphous metal stator or rotor core and integral capacitor.

Another technique for building magnetic cores from long continuous strips of amorphous metal coated with insulation is to wind the material spirally like a roll of tape. The stator or rotor core in FIG. 6 is wound twoin-hand spirally, and every turn at a successively greater diameter has the four-layered cross section of FIG. 3 comprised of alternating metal strips and insulating layers. The two parallel metal strips 25 and 26 are the capacitor plates, and the insulating layers 27 and 28 between are the capacitor dielectric. Metallic glass material is strong and ductile and in practice it is possible to pull the strips during winding and produce a tightly wound cylindrical or disk-shaped core structure with a high packing factor. Electrical connections to the pair of spirally wound capacitor plates are made at the ends of the metal strips, which can be of uniform width or slotted. The insulating layer is coated onto the ribbon or is a separate film of material, and for some applications may be an oxide formed on the surface of the ribbon.

Figure 7:
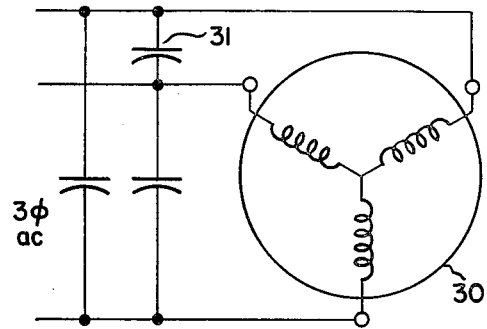
FIG. 7 is a circuit diagram of a prior art polyphase motor with separate power factor correction capacitors.
Figure 8:
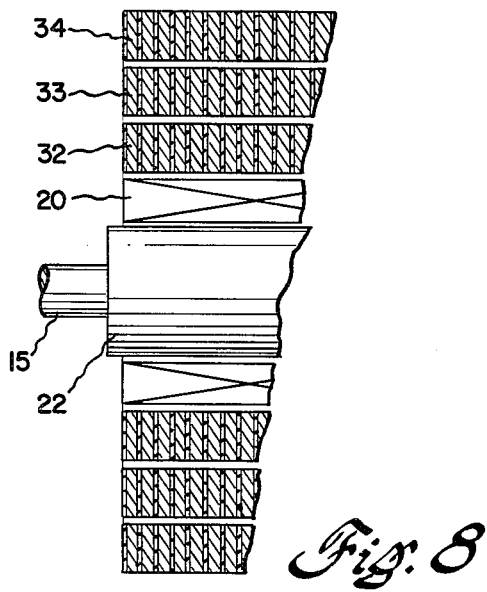
FIG. 8 is a fragmentary cross section of the slotless motor of FIG. 4 with plural edge-wound cores and integral capacitors.

A conventional prior art polyphase induction motor 30 is illustrated in FIG. 7 with three power factor correction capacitors 31 across the motor terminals. Plural isolated integral capacitors are realized by using plural amorphous metal cores or core sections that are concentric with one another or axially aligned with one another. Another embodiment of the invention in FIG. 8 is a slotless motor similar to FIG. 4 but with three concentric helical cores 32, 33 and 34. The three core sections are magnetically coupled with the stator windings but are electrically isolated in their functions as power factor correction capacitors. The three capacitors are connected across the three different pairs of stator windings the same as in FIG. 7. Core sections 32, 33 and 34 are identical to one another and assembled as taught in FIGS. 2 and 3, and can be made from narrower widths of amorphous metal tape. Ribbon widths of one-half inch are available commercially at present and wider widths have been reported.

Figure 9:
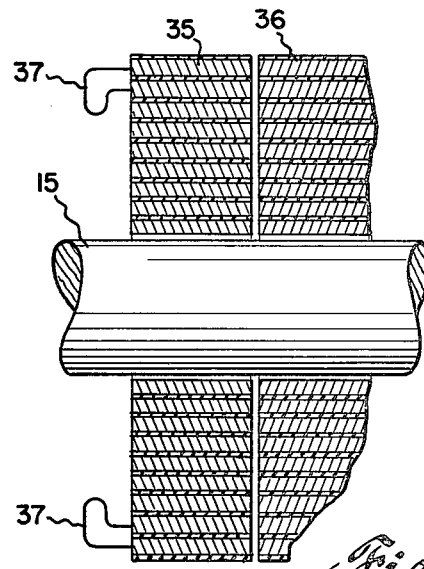
FIG. 9 is a fragmentary cross section of a rotor with multiple spirally wound cores and integral capacitors.

Similar schemes are employed to utilize the interlaminar capacitance of an amorphous metal rotor core. FIG. 9 depicts a relatively long magnetic core structure composed of two (or more) axially aligned rotor core sections 35 and 36 which can be identical to one another and wound spirally as taught in FIG. 6. The dry capacitor integral with each core section is electrically connected in circuit relationship with rotor winding 37 or a portion of the rotor winding, or can be coupled to the outside by means of slip rings. It is also possible to construct the stator core with multiple spirally wound and axially aligned core sections. Disk type motors can have spirally wound amorphous metal cores with radial slots at one or both sides of the core to receive the windings, and these can be made with an integral capacitor. A multiple disk amorphous metal motor is disclosed and claimed in allowed copending application Ser. No. 910,677, filed on May 30, 1978 by W. R. Oney, entitled "High Power Density Brushless DC Motor", and assigned to the same assignee.

The invention as broadly defined has application to generators and other types of motors than those that have been mentioned specifically. The capacitor integral with the amorphous metal magnetic circuit may in some circumstances find utility to provide commutating capacitance in an associated solid state converter or to smooth rectified currents. The prime consideration, however, is the magnetic area needed to carry the magnetic flux and the amount of available capacitance depends on the interlaminar capacitance of this magnetic circuit. The reduction in cost, weight and space by having the magnetic core serve in a dual capacity is compounded with the low losses and potential low cost of amorphous metal magnetic materials.

While the invention has been particularly shown and described with reference to several preferred embodiments thereof, it will be understood by those skilled in the art that the foregoing and other changes in form and details may be made therein without departing from the spirit and scope of the invention.

What is claimed is:

1. An electric machine comprising: a stator and a rotor mounted for relative rotation at least one of which has a laminated magnetic core that has a dual function as a capacitor and is constructed of multiple insulated turns of magnetic amorphous metal ribbon of relatively long length; an energizing winding on and magnetically coupled with said laminated core; at least part of said winding also being electrically connected to the ribbon such that said insulated turns of amorphous metal ribbon are said capacitor which is in circuit relationship with said winding.

2. An electric machine comprising: a stator and a rotor mounted coaxially for relative rotation at least one of which has a laminated magnetic core that has a dual function as a capacitor and is constructed of multiple insulated turns of a pair of superimposed magnetic amorphous metal ribbons of relatively long length separated by alternating insulating layers; an energizing winding on and magnetically coupled with said laminated core; at least part of said winding also being electrically connected to said pair of amorphous metal ribbons separated by insulating layers which function as said capacitor in circuit relationship with said winding.

3. The electric machine of claim 2 wherein said pair of ribbons both have a thickness of about 2 mils and wherein said pair of ribbons are permanently connected in circuit relationship with at least part of said winding.

4. The electric machine of claim 2 wherein said pair of amorphous metal ribbons separated by insulating layers are edge-mounted and wound helically in said laminated core.

5. The electric machine of claim 2 wherein said pair of amorphous metal ribbons separated by insulating layers are wound spirally so that successive turns have a larger diameter in said laminated core.

6. The electric machine of claim 4 or claim 5 further including at least one additional laminated core comprised of multiple turns of another pair of magnetic amorphous metal ribbons separated by insulating layers; at least part of said winding being magnetically coupled with said additional laminated core and also electrically connected to said other pair of amorphous metal ribbons separated by insulating layers which function as another capacitor in circuit relationship with said winding.

7. A single phase electric motor with an integral capacitor comprising: a stator and a rotor mounted coaxially for relative rotation with an air gap therebetween; said stator having a laminated magnetic core that is comprised of multiple turns of a pair of parallel magnetic amorphous metal ribbons separated by alternating insulating layers; a main stator winding and an auxiliary stator winding on and magnetically coupled with said laminated core and producing an air gap magnetic field for rotating said rotor; said auxiliary winding further being electrically connected in series circuit relationship with said pair of amorphous metal ribbons separated by insulating layers which function as the capacitor in an auxiliary winding circuit.

8. The electric motor of claim 7 wherein said pair of amorphous metal ribbons separated by insulating layers are edge-mounted and wound helically in said laminated core.

9. The electric motor of claim 7 wherein said pair of amorphous metal ribbons separated by insulating layers are wound spirally so that successive turns have a larger diameter in said laminated core.

10. An electric motor with an integral capacitor comprising: a stator and a rotor mounted coaxially for relative rotation with an air gap therebetween; said stator having a laminated magnetic core that is comprised of multiple insulated turns of a pair of parallel magnetic amorphous metal ribbons separated by insualting layers; a stator winding on and magnetically coupled with said laminated core and producing an air gap magnetic field for rotating said rotor; said stator winding also being electrically connected in circuit relationship with said pair of amorphous metal ribbons separated by insulating layers which function as said capacitor to effect power factor correction.

11. The electric motor of claim 10 wherein said pair of amorphous metal ribbons separated by insulating layer are edge-mounted and wound helically in said laminated core; and at least one additional laminated helical core concentric with said first-mentioned core and constructed in similar fashion from another pair of helically wound magnetic amorphous metal ribbons separated by insulating layers; said stator winding being magnetically coupled with said additional helical core and also electrically connected in circuit relationship with said other pair of amorphous metal ribbons separated by insualting layers which function as an additional capacitor for power factor correction.

12. The electric motor of claim 10 wherein said pair of amorphous metal ribbons separated by insulating layers are wound spirally so that successive turns have a larger diameter in said laminated core; and at least one additional laminated spiral core axially aligned with said first-mentioned core and constructed in similar fashion from another pair of spirally wound magnetic amorphous metal ribbons separated by insulating layers; said stator winding being on and magnetically coupled with said additional spiral core and also electrically connected in circuit relationship with said other pair of amorphous metal ribbons separated by insulating layers which function as an additional capacitor for power factor correction.

* * * * *